(12) United States Patent
Rodrigo et al.

(10) Patent No.: US 11,924,294 B2
(45) Date of Patent: Mar. 5, 2024

(54) SERVICE REQUEST HANDLING

(71) Applicant: Telefonaktiebolaget LM Ericsson (publ), Stockholm (SE)

(72) Inventors: Maria Cruz Bartolome Rodrigo, Torremocha de Jarama Madrid (ES); Magnus Hallenstål, Täby (SE); Aldo Bolle, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/015,185

(22) PCT Filed: Jun. 25, 2021

(86) PCT No.: PCT/EP2021/067512
§ 371 (c)(1),
(2) Date: Jan. 9, 2023

(87) PCT Pub. No.: WO2022/022910
PCT Pub. Date: Feb. 3, 2022

(65) Prior Publication Data
US 2023/0254381 A1   Aug. 10, 2023

(30) Foreign Application Priority Data

Jul. 31, 2020 (EP) .................................. 20382707

(51) Int. Cl.
*H04L 67/51* (2022.01)
*H04L 67/562* (2022.01)

(52) U.S. Cl.
CPC ............ *H04L 67/51* (2022.05); *H04L 67/562* (2022.05)

(58) Field of Classification Search
CPC ........ H04L 67/56; H04L 67/02; H04W 48/18; H04W 60/00
See application file for complete search history.

(56) References Cited

U.S. PATENT DOCUMENTS 10,833,938 B1 * 11/2020 Rajput ................ H04L 67/1095
11,197,176 B2 * 12/2021 Pokkunuri ............ H04W 48/16
(Continued)

OTHER PUBLICATIONS

ETSI TS 129 510 V15.3.0 (Apr. 2019)/ 5G, 5G System; Network function repository services; Stage 3 (3GPP TS 29.510 version 15.3.0 Release 15), pp. 1-120. (Year: 2019).*
(Continued)

*Primary Examiner* — Chirag R Patel
(74) *Attorney, Agent, or Firm* — Murphy, Bilak & Homiller, PLLC (57) ABSTRACT

There is provided a method for handling a service request. The method is performed by a first service communication proxy (SCP) node. In response to receiving a first request from a first Network Function (NF) node for a further NF node to provide a first service, the first SCP node selects (102) a second NF node to provide the first service and stores (104) an identifier of the second NF node. The first SCP node also initiates transmission (106) towards the second NF node of the first request. In response to receiving, from the second NF node, a first response, the first SCP node stores (108) location information of the second NF node. The location information of the second NF node is stored in association with the identifier of the second NF node. The first SCP node also initiates transmission (110) of the first response towards the first NF node.

18 Claims, 8 Drawing Sheets

(56) References Cited

U.S. PATENT DOCUMENTS

| | | | | |
|---|---|---|---|---|
| 11,564,154 B2* | 1/2023 | Belling | ............ | H04L 45/00 |
| 11,659,454 B2* | 5/2023 | Dao | ............ | H04W 36/0033 |
| | | | | 370/331 |
| 2017/0262628 A1 | 9/2017 | Kimura | | |
| 2019/0007275 A1* | 1/2019 | Clemm | ............ | H04L 63/0421 |
| 2020/0127916 A1 | 4/2020 | Krishan | | |
| 2021/0377053 A1* | 12/2021 | Mahajan | ............ | H04L 63/0281 |

OTHER PUBLICATIONS

"3GPP TS 23.501 V16.5.0", 3rd Generation Partnership Project; Technical Specification Group Services and System Aspects; System architecture for the 5G System (5GS); Stage 2 (Release 16), Jul. 2020, pp. 1-441.

"3GPP TS 29.510 V16.4.0", 3rd Generation Partnership Project; Technical Specification Group Core Network and Terminals; 5G System; Network Function Repository Services; Stage 3 (Release 16), Jul. 2020, pp. 1-192.

"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

"Clarifications for scenarios with more than one SCP", 3GPP TSG-CT WG4 Meeting #98e, C4-203498, E-Meeting, Revision of C4-203135, Jun. 2-12, 2020, pp. 1-9.

"NF Set and NF service Set clean up", 3GPP TSG-SA WG2 Meeting #132, S2-1903173, Xi'an, China, (revision of S2-19xxxx), Apr. 8-12, 2019, pp. 1-8.

"Supported Headers and Links", 3GPP TSG-CT4 Meeting #97-e, C4-202054, Online, Apr. 15-23, 2020, pp. 1-16.

* cited by examiner

SERVICE REQUEST HANDLING

TECHNICAL FIELD

The disclosure relates to methods for handling a service request in a network and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer (NFc) and the NF node of the service producer (NFp) can communicate directly or indirectly. This is referred to as direct communication and indirect communication respectively. In the case of indirect communication, the NF node of the service consumer and the NF node of the service producer may communicate via a service communication proxy (SCP) node.

Figure 1:
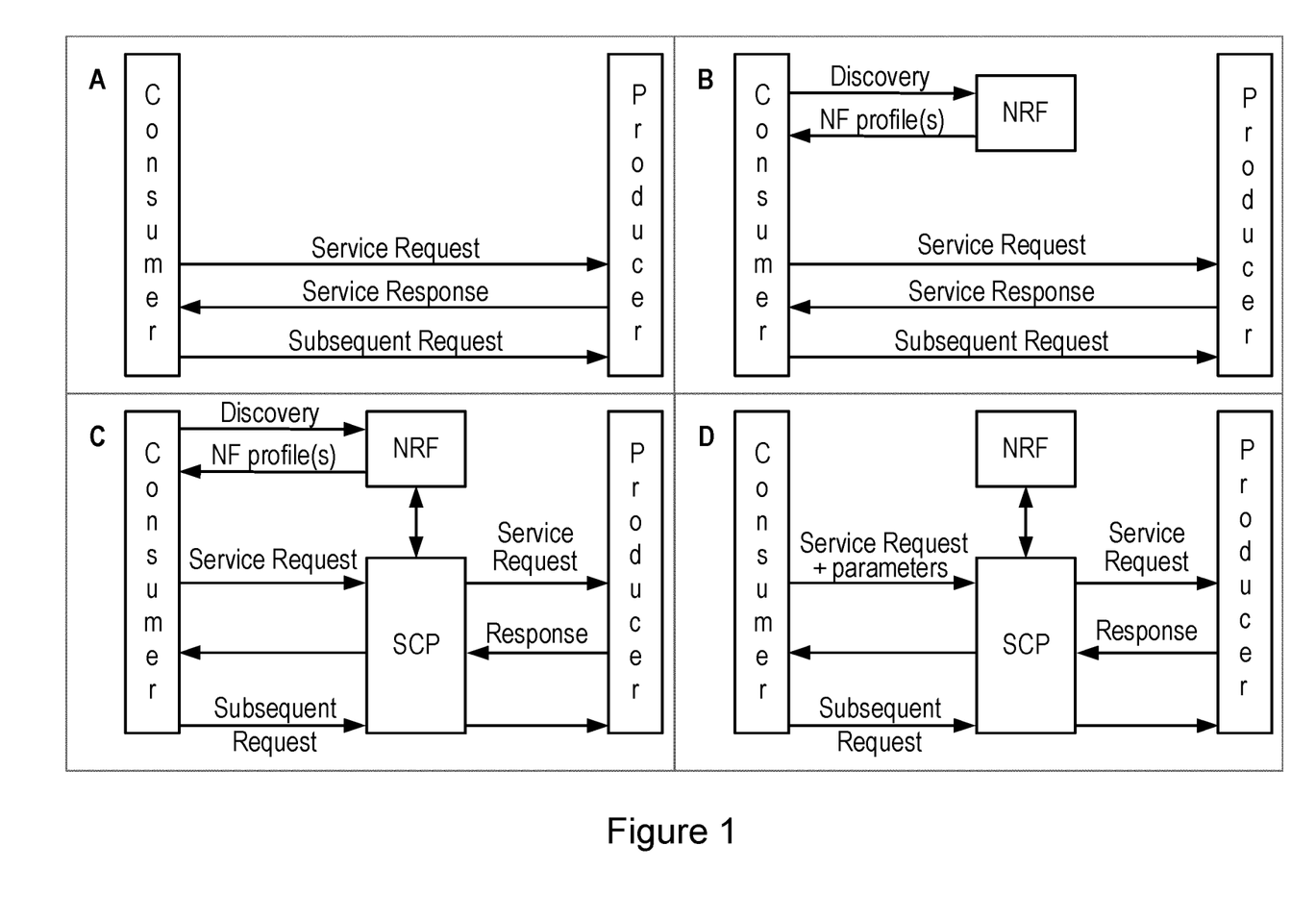

FIG. 1A-D illustrates different existing systems for handling service requests, as set out in 3GPP TS 23.501 v16.5.0 (available at https://portal.3gpp.org/desktopmodules/Specifications/SpecificationDetails.aspx?specificationId=3144 as of 27 Jul. 2020). In more detail, FIGS. 1A and 1B illustrates a system that uses direct communication, while FIGS. 1C and 1D illustrates a system that uses indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF). Thus, in the system illustrated in FIG. 1B, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In the system illustrated in FIG. 1A, the NRF is not used and instead the NF node of the consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP. Similarly, any subsequent service requests are sent indirectly from the NF node of the service consumer to the NF node of the service producer via the SCP. The systems illustrated in FIGS. 1C and D also comprise an NRF.

In the system illustrated in FIG. 1O, the NF node of the consumer can query the NRF to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In this case, the service request sent from the NF node of the service consumer to the SCP comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP may communicate with the NRF to acquire selection parameters (e.g. location, capacity, etc.) and the SCP may select an NF node of the service producer to which to send the service request.

In the system illustrated in FIG. 1D, the NF node of the consumer does not carry out the discovery or selection process. Instead, the NF node of the consumer adds any necessary discovery and selection parameters (required to find a suitable NF node of the service producer) to the service request that it sends via the SCP. The SCP uses the request address and the discovery and selection parameters in the service request to route the service request to a suitable NF node of the service producer. The SCP can perform discovery with the NRF.

US 2020/0127916 A1 discloses a method for locality-based selection and routing of network traffic to producer NFs. The method comprises producer NFs registering locality information with NRFs, and consumer NFs configuring locality preference rules.

For the fifth generation core (5GC), from Release 16, the SCP is included as a network element to allow indirect communication between an NF node of a service consumer and an NF node of a service producer. The indirect communication that is used can be either of the two indirect communications options described earlier with reference to FIGS. 1C and 1D.

Where communication mode D (as shown in FIG. 1D) is used, all discovery and selection processes are delegated to the SCP. Accordingly, if it is necessary to perform reselection, that is, selection of an alternative NFp, this reselection is the responsibility of the SCP. In some systems, binding (in which the NFp gives parameters to the NFc that dictate which NFp or set of NFps the NFc can connect to subsequently) may be used. For systems where binding between the NFc and NFp is not used, either because a decision not to use binding is made or because one of the NFc, NFp and SCP do not support binding, it may be necessary for the SCP to store execution context (for example, UE/session context) data. This can place an unnecessary storage burden on the SCP, which may essentially function as an intermediary in communications between the NFc and NFp.

SUMMARY

It is an object of the disclosure to obviate or eliminate at least some of the above-described disadvantages associated with existing techniques.

Therefore, according to an aspect of the disclosure, there is provided a method for handling a service request in a network, wherein the method is performed by a first service communication proxy (SCP) node that is configured to operate as an SCP between a first network function (NF) node of a service consumer and a second NF node of a service producer in the network. In response to receiving, from the first NF node, a first request for a further NF node to provide a first service, the first SCP node selects the second NF node using discovery parameters received from the first NF node as the further NF node to provide the first service and stores an identifier of the second NF node obtained from a profile of the second NF node. The first SCP node also initiates transmission towards the second NF node of the first request. In response to receiving a first response to the first request from the second NF node, the first SCP node obtains and stores location information of the second NF node, from the first response, in association with the identifier of the second NF node, and initiates transmission of the first response towards the first NF node.

In some embodiments, the identifier of the second NF node may be an instance ID of the second NF node. In some embodiments, the instance ID may be obtained from a profile of the second NF node, which may be received at the first SCP node in a discovery response from a Network Repository Function (NRF) node, where the discovery response is sent by the NRF node in response to a discovery request from the first SCP node. Alternatively, the profile of the second NF node may be stored in the first SCP node.

In some embodiments, the location information of the second NF node may be the apiRoot of the second NF node, which may be obtained from a location header included in the first response from the second NF node.

In some embodiments, the first SCP node may store the identifier of the second NF node and the location information of the second NF node in a mapping table, where the mapping table may store the identifier of the second NF node in a 1-1 association with the location information of the second NF node. The mapping table may be stored in a memory of the first SCP node, or in a memory contactable by the first SCP node.

In some embodiments, the method may also include the first SCP node receiving from the first NF node a second request that is a subsequent request for the second NF node to provide the first service. In response, the first SCP node may initiate transmission towards the second NF node of the second request including the location information of the second NF node. If the second request cannot be fulfilled by the second NF node, the first SCP node may identify the associated identifier of the second NF node using the location information of the second NF node, and obtain a profile of the second NF node using the identifier of the second NF node. The first SCP node may then use the profile of the second NF node to re-select a third NF node, and initiate transmission of the second request to the third NF node.

In some embodiments, it may be that the second request cannot be fulfilled by the second NF node if the second request cannot be fulfilled if the second request transmitted towards the second NF node is unsuccessful, no response is received from the second NF node, or transmission of the second request towards the second NF node is prevented.

In some embodiments, the identifier of the second NF node may be used in a discovery process to obtain the profile of the second NF node, where the discovery process may be a new discovery, and/or wherein the discovery process may comprise checking stored discovery results.

In some embodiments, the profile of the second NF node may be a NFp profile, wherein the NFp profile is used to identify a set of NF nodes of the service producer that comprises the second NF node and wherein the set of NF nodes may further comprise the third NF node of the service producer. In some embodiments, the set of NF nodes of the service producer that comprises the second NF node may be identified using a Set ID, and the third NF node may be selected from the NF nodes specified by the Set ID.

In some embodiments, the method may further comprise receiving an acceptance response from the third NF node including location information of the third NF node, and storing an identifier of the third NF node in association with the location information of the third NF node. The identifier of the third NF node and location information of the third NF node may replace the identifier of the second NF node and location information of the second NF node, or the identifier of the third NF node and location information of the third NF node may be stored in addition to the location information of the second NF node, where the location information of the second NF node may be associated with the stored identifier of the third NF node.

In some embodiments, the first SCP node and the first NF node may be deployed in independent deployment units, and/or the first SCP node and the second NF node may be deployed in independent deployment units.

In some embodiments, the first SCP node may be deployed as a distributed network element.

In some embodiments, part of the first SCP node may be deployed in the same deployment unit as the first NF node, and/or part of the first SCP node may be deployed in the same deployment unit as the second NF node.

In some embodiments, at least one second SCP node may be configured to operate as an SCP between the first NF node and the first SCP node, wherein the at least one second SCP node may be a different SCP node to the first SCP node, and/or at least one third SCP node may be configured to operate as an SCP between the first SCP node and the second NF node, wherein the at least one third SCP node may be a different SCP node to the first SCP node.

In some embodiments, the first SCP node and one or both of the at least one second SCP node and the at least one third SCP node may be deployed in independent deployment units.

In some embodiments, the at least one second SCP node and/or the at least one third SCP node may be deployed as distributed network elements.

In some embodiments, an entity may comprise the first SCP node and a network repository function (NRF) node.

According to another aspect of the disclosure, there is provided a first SCP node comprising processing circuitry configured to operate in accordance with the method described earlier in respect of the first SCP node. In some embodiments, the first SCP node may comprise at least one memory for storing instructions which, when executed by the processing circuitry, cause the first SCP node to operate in accordance with the method described earlier in respect of the first SCP node.

According to another aspect of the disclosure, there is provided a method performed by a system. The method may comprise the method described earlier in respect of the first SCP node and the method as described earlier in respect of one or more of the first, second and third NF nodes.

According to another aspect of the disclosure, there is provided a system. The system may comprise at least one first SCP node as described earlier and at least one of the first, second and third NF nodes as described earlier.

According to another aspect of the disclosure, there is provided a computer program comprising instructions which, when executed by processing circuitry, cause the processing circuitry to perform the method as described earlier in respect of the first SCP node.

According to another aspect of the disclosure, there is provided a computer program product, embodied on a non-transitory machine-readable medium, comprising instructions which are executable by processing circuitry to cause the processing circuitry to perform the method as described earlier in respect of the first SCP node.

Thus, an improved technique for handling service requests in a network is provided.

BRIEF DESCRIPTION OF THE DRAWINGS

For a better understanding of the technique, and to show how it may be put into effect, reference will now be made, by way of example, to the accompanying drawings, in which:

FIG. 1A-D is a block diagram illustrating different existing systems;

FIG. 3A-B is a flowchart illustrating a method performed by a first SCP node according to an embodiment;

FIG. 4A-C is a signalling diagram illustrating an exchange of signals in a system according to an embodiment.

DETAILED DESCRIPTION

Herein, techniques for handling a service request in a network are described. A service request can also be referred to as a request for a service. Generally, a service is software intended to be managed for users. Herein, a service can be any type of service, such as a communication service (e.g. a notification service or a callback service), a context management (e.g. user equipment context management (UECM)) service, a data management (DM) service, or any other type of service. The techniques described herein can be used in respect of any network, such as any communications or telecommunications network, e.g. cellular network. The network may be a fifth generation (5G) network or any other generation network. In some embodiments, the network may be a core network or a radio access network (RAN). The techniques described herein are implemented by a first service communication proxy (SCP) node and optionally also a first network function (NF) node of a service consumer. The first SCP node can be configured to operate as an SCP between the first NF node and at least one NF node of a service producer in the network.

An NF is a third generation partnership project (3GPP) adopted or 3GPP defined processing function in a network, which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios.

Figure 2:
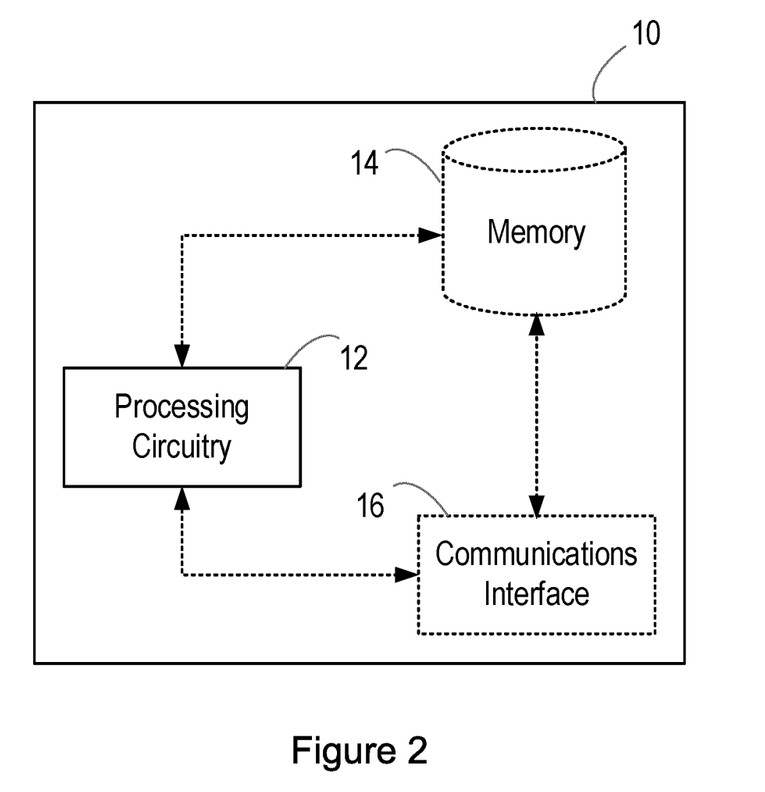
FIG. 2 is a block diagram illustrating a first service communication proxy (SCP) node according to an embodiment.

FIG. 2 illustrates a first SCP node 10 in accordance with an embodiment. The first SCP node 10 is for handling a service request in a network. The first SCP node 10 is configured to operate as an SCP between a first network function (NF) node of a service consumer and a second NF node of a service producer in the network. In some embodiments, the first SCP node 10 can be, for example, be a physical machine (e.g. a server) or a virtual machine (VM).

As illustrated in FIG. 2, the first SCP node 10 comprises processing circuitry (or logic) 12. The processing circuitry 12 controls the operation of the first SCP node 10 and can implement the method described herein in respect of the first SCP node 10. The processing circuitry 12 can be configured or programmed to control the first SCP node in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first SCP node 10. In some embodiments, the processing circuitry 12 can be configured to run software to perform the method described herein in respect of the first SCP node 10. The software may be containerised according to some embodiments. Thus, in some embodiments, the processing circuitry 12 may be configured to run a container to perform the method described herein in respect of the first SCP node 10.

Briefly, the processing circuitry 12 of the first SCP node 10 is configured to, in response to receiving a first request from a first NF node 20 for a further NF node to provide (e.g. execute or run) a first service 40 requested by the first NF node 20, select a second NF node 30 as the NF node to provide the first service 40. The processing circuitry 12 of the first SCP node 10 is further configured to store an identifier of the second NF node 30, and initiate transmission towards the second NF node 30 of the first request. The processing circuitry 12 of the first SCP node 10 is also configured, in response to receiving a first response from the second NF node 30, to store location information of the second NF node 30 in association with the identifier of the second NF node 30; and to initiate transmission of the first response towards the first NF node 20.

As illustrated in FIG. 2, in some embodiments, the first SCP node 10 may optionally comprise a memory 14. The memory 14 of the first SCP node 10 can comprise a volatile memory or a non-volatile memory. In some embodiments, the memory 14 of the first SCP node 10 may comprise a non-transitory media. Examples of the memory 14 of the first SCP node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first SCP node 10 can be connected to the memory of the first SCP node 10. In some embodiments, the memory 14 of the first SCP node 10 may be for storing program code or instructions which, when executed by the processing circuitry 12 of the first SCP node 10, cause the first SCP node 10 to operate in the manner described herein in respect of the first SCP node 10. For example, in some embodiments, the memory 14 of the first SCP node 10 may be configured to store program code or instructions that can be executed by the processing circuitry 12 of the first SCP node 10 to cause the first SCP node 10 to operate in accordance with the method described herein in respect of the first SCP node 10. Alternatively or in addition, the memory 14 of the first SCP node 10 can be configured to store any information, data, messages, requests, responses, indications, notifications, signals, or similar, that are described herein. The processing circuitry 12 of the first SCP node 10 may be configured to control the memory 14 of the first SCP node 10 to store information, data, messages, requests, responses, indications, notifications, signals, or similar, that are described herein.

In some embodiments, as illustrated in FIG. 2, the first SCP node 10 may optionally comprise a communications interface 16. The communications interface 16 of the first SCP node 10 can be connected to the processing circuitry 12 of the first SCP node 10 and/or the memory 14 of first SCP node 10. The communications interface 16 of the first SCP node 10 may be operable to allow the processing circuitry 12 of the first SCP node 10 to communicate with the memory 14 of the first SCP node 10 and/or vice versa. Similarly, the communications interface 16 of the first SCP node 10 may be operable to allow the processing circuitry 12 of the first SCP node 10 to communicate with the first NF node and/or any other node. The communications interface 16 of the first SCP node 10 can be configured to transmit and/or receive information, data, messages, requests, responses, indications, notifications, signals, or similar, that are described herein. In some embodiments, the processing circuitry 12 of the first SCP node 10 may be configured to control the communications interface 16 of the first SCP node 10 to transmit and/or receive information, data, messages, requests, responses, indications, notifications, signals, or similar, that are described herein.

Although the first SCP node 10 is illustrated in FIG. 2 as comprising a single memory 14, it will be appreciated that the first SCP node 10 may comprise at least one memory (i.e. a single memory or a plurality of memories) 14 that operate in the manner described herein. Similarly, although the first SCP node 10 is illustrated in FIG. 2 as comprising a single communications interface 16, it will be appreciated that the first SCP node 10 may comprise at least one communications interface (i.e. a single communications interface or a plurality of communications interfaces) 16 that operate in the manner described herein. It will also be appreciated that FIG. 2 only shows the components required to illustrate an embodiment of the first SCP node 10 and, in practical implementations, the first SCP node 10 may comprise additional or alternative components to those shown.

Figure 3A:
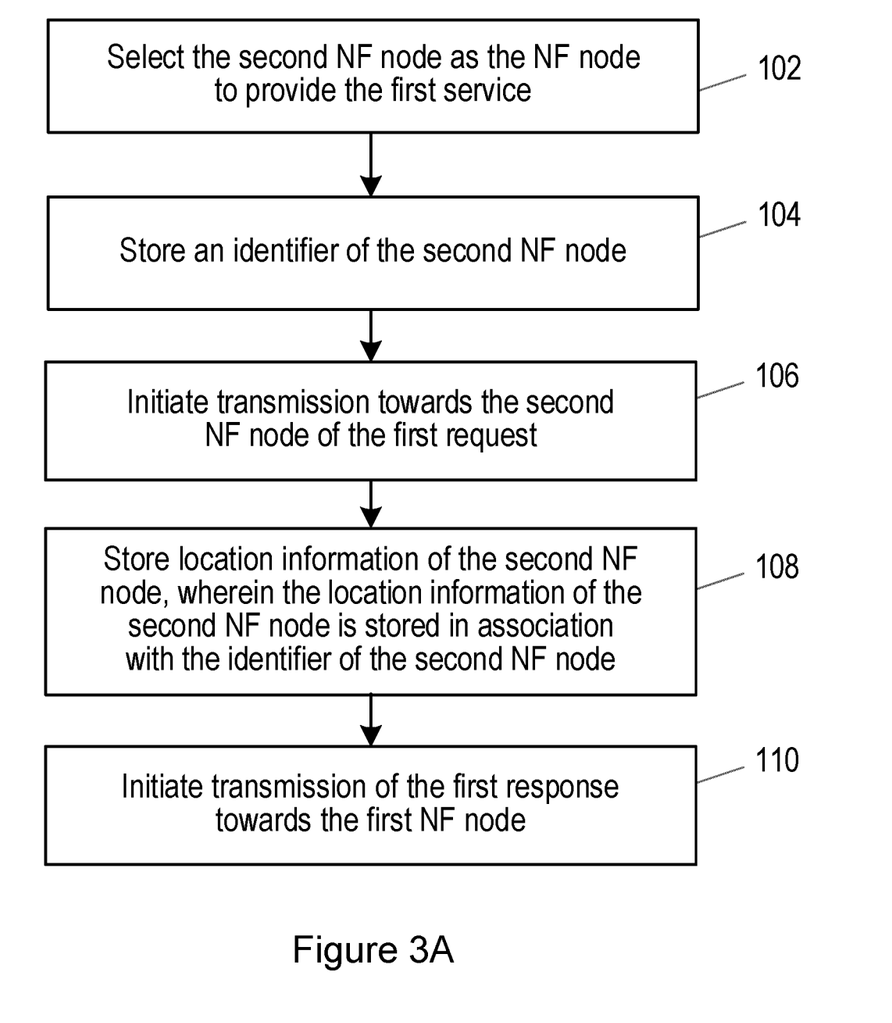

FIG. 3A-B is a flowchart illustrating a method performed by a first SCP node 10 in accordance with an embodiment. The first SCP node 10 is configured to operate as an SCP between a first NF node of a service consumer and a second NF node of a service producer in the network. The method is for handling a service request in the network. The first SCP node 10 described earlier with referenced to FIG. 2 can be configured to operate in accordance with the method of FIG. 3A-B. The method can be performed by or under the control of the processing circuitry 12 of the first SCP node 10.

The method of FIG. 3A-B is performed when the first SCP node 10 receives a first request, for a first service to be provided by a further NF node, from the first NF node 20. The first SCP node 10 selects an NF node, referred to herein as the second NF node, as the further node to provide the service (see block 102 of FIG. 3A). The selection may be made by the first SCP node 10 using discovery parameters received from the first NF node in the first request, for example. After selecting the second NF node to provide the first service, the first SCP node 10 stores an identifier of the second NF node (see block 104 of FIG. 3A). The identifier (ID) may be, for example, an instance ID of the second NF node, and may be obtained from a profile of second NF node. An instance ID can be an ID that identifies the instance of the second NF node.

Where the identifier of the second NF node (which may be an instance ID) is obtained from a profile of the second NF node, said profile may be received at the first SCP node 10 in a discovery response from a Network Repository Function, NRF node, the discovery response being sent by the NRF node in response to a discovery request from the first SCP node 10. The discovery request may be sent by the first SCP node after receiving the first request from the first NF node. Alternatively, the profile of the second NF node may be stored in the first SCP node 10.

The first SCP node 10 then initiates transmission of the first request towards the second NF node, as illustrated by block 106 of FIG. 3A. Herein, the term "initiate" can mean, for example, cause or establish. Thus, the processing circuitry 12 of the first SCP node 10 can be configured to itself transmit the first request (e.g. via a communications interface 16 of the first SCP node 10) or can be configured to cause another node to transmit the first request. The first SCP node 10 may, for example, modify the address in the first request (received from the first NF node) from the address of the first SCP node 10 to the address of the host of the second NF node.

In response to receiving a response from the second NF node, the first SCP node then stores location information of the second NF node (see block 108 of FIG. 3A). The location information may be obtained, for example, from a response from the second NF node. Alternatively, the location information may be obtained from another source. The location information of the second NF node may be, for example, an apiRoot of the second NF node 30. The apiRoot is a Uniform Resource Indicator (URI) that identifies a particular resource (in this case, the second NF node). Where the location information is an apiRoot, this may be obtained from a location header included in the first response from the second NF node (for example, a 3GPP-Sbi-Target-apiRoot header, which is a header comprising an application programming interface (API) root of a uniform resource identifier (URI) used to reach of the second NF node).

The location information of the second NF node may be stored in association (that is linked to) the identifier of the second NF node. The location information and identifier may be stored, for example, in a mapping table. Where a mapping table is used, this mapping table may include a 1-1 association between the location information of NF nodes and identifiers of NF nodes, that is, each NF node identifier may be associated with a single NF node location and vice versa. Alternatively, there may be a many-1 or 1-many relationship between the identifiers and locations. Where a mapping table is used, this mapping table may be stored in a memory of the SCP node 10, or stored in a memory contactable by the SCP node 10.

The response from the second NF node is then transmitted to the first NF node. The first SCP node 10 initiates the transmission of this response (see block 110 of FIG. 3A). As in the case of the sending of the first request to the second NF node, the first SCP node 10 may simply modify the address in the response (received from the second NF node) from the address of the first SCP node 10 to the address of the first NF node. The processing of the first request by the first SCP node 10 may then end.

The first SCP node 10 may subsequently receive a further request from the first NF node. This further request may be referred to as a second or subsequent request. The second request may be for the second NF node to provide the first service, that is, the same service as was requested in the first request. In response to receiving the second request, the first SCP node 10 may initiate transmission towards the second NF node of the second request (see block 202 of FIG. 3B), wherein the second request includes the location information of the second NF node. Again, the request may be sent to the second NF node by modifying the address in the request. The first SCP node 10 may then await a response from the second NF node. If the response is successful (the second NF node can provide the requested service), then this response may then be sent on to the first NF node. However, if the response is unsuccessful (the second NF node cannot provide the requested service, for example, there is an error), there is a lack of response from the second NF node to the second request, or the first SCP node 10 is prevented from transmitting the second request towards the second NF node, then the second request cannot be fulfilled by the second NF node.

Where the second request cannot be fulfilled by the second NF node, the first SCP node 10 may use the location information for the second NF node to identify the associated identifier of the second NF node (see block 204 of FIG. 3B), by consulting the storage in which the location information and identifiers are associated. For example, where a mapping table is used, this mapping table may be consulted to identify the identifier of the second NF node.

Figure 3B:
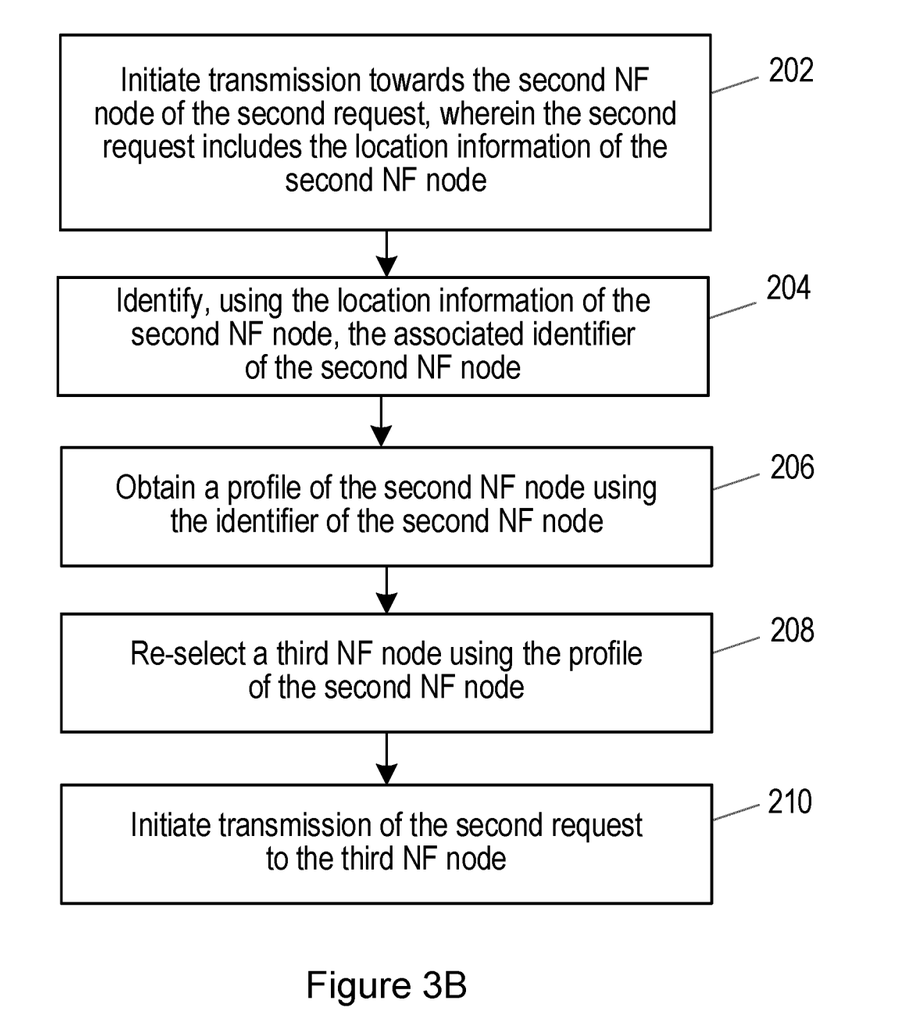

Once the identifier of the second NF node has been identified, this may be used to obtain a profile of the second NF node 30 (see block 206 of FIG. 3B). The identifier of the second NF node may be used in a discovery process to obtain the profile of the second NF node, where the discovery process may be a new discovery, or where the discovery process comprises checking stored discovery results (which may be stored, for example, at the first SCP node 10). When the profile of the second NF node has been obtained, this profile may be used to re-select a third NF node of a service producer (see block 208 of FIG. 3B) to provide the service requested in the subsequent request. The third NF node may be related to the second NF node, for example, the second and third NF nodes may both be part of a set of NF nodes. When the profile of the second NF node is an NFp profile, this may be used to identify a set of NF nodes of the service producer that comprises the second NF node, and the set of NF nodes may further comprise the third NF node of the service producer. The set of NF nodes of the service producer that comprises the second NF node may be identified using a Set identifier (ID), and the third NF node may be selected from the NF nodes specified by the Set ID. The identifier of the third NF node may then be stored by the third NF node.

When the third NF node has been reselected, the first SCP node 10 may initiate transmission of the second request to the third NF node, as discussed above (see block 210 of FIG. 3B). The first SCP node 10 may then receive a response from the third NF node. If a response received from the third NF node is an acceptance response, the first SCP node 10 may store the identifier of the third NF node at that point. Further, if the acceptance response from the third NF node includes location information of the third NF node, this location information may be stored in association with the identifier of the third NF node as discussed above in the context of the second NF node.

If the location information and identifier of the third NF node are stored, this may replace the identifier of the second NF node and location information of the second NF node. Alternatively, the identifier of the third NF node and location information of the third NF node may be stored in addition to the location information of the second NF node, wherein the location information of the second NF node is associated with the stored identifier of the third NF node and the identifier of the second NF node may be deleted or may simply no longer be associated with the location information of the second NF node 30.

Figure 4A:
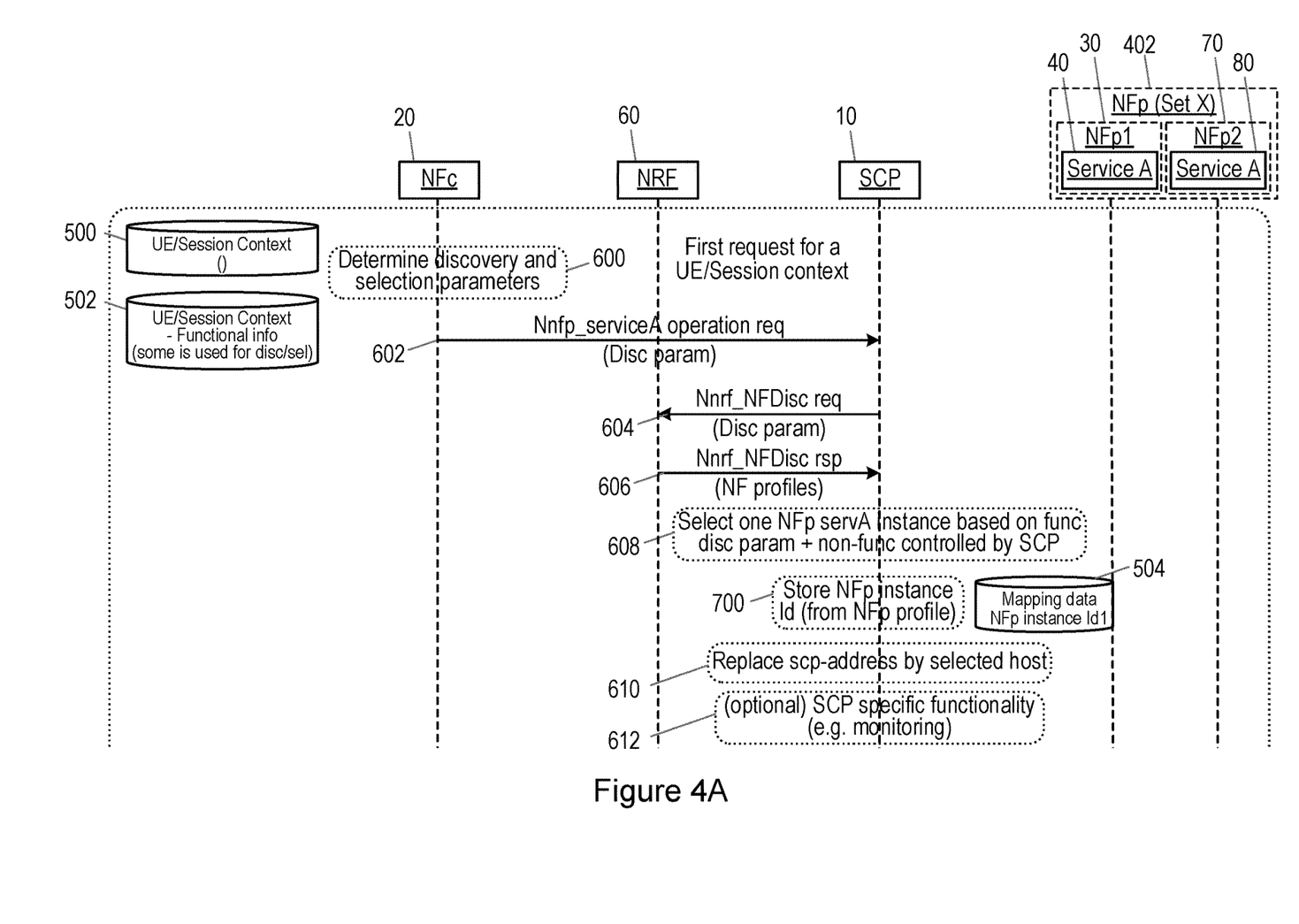
Figure 4B:
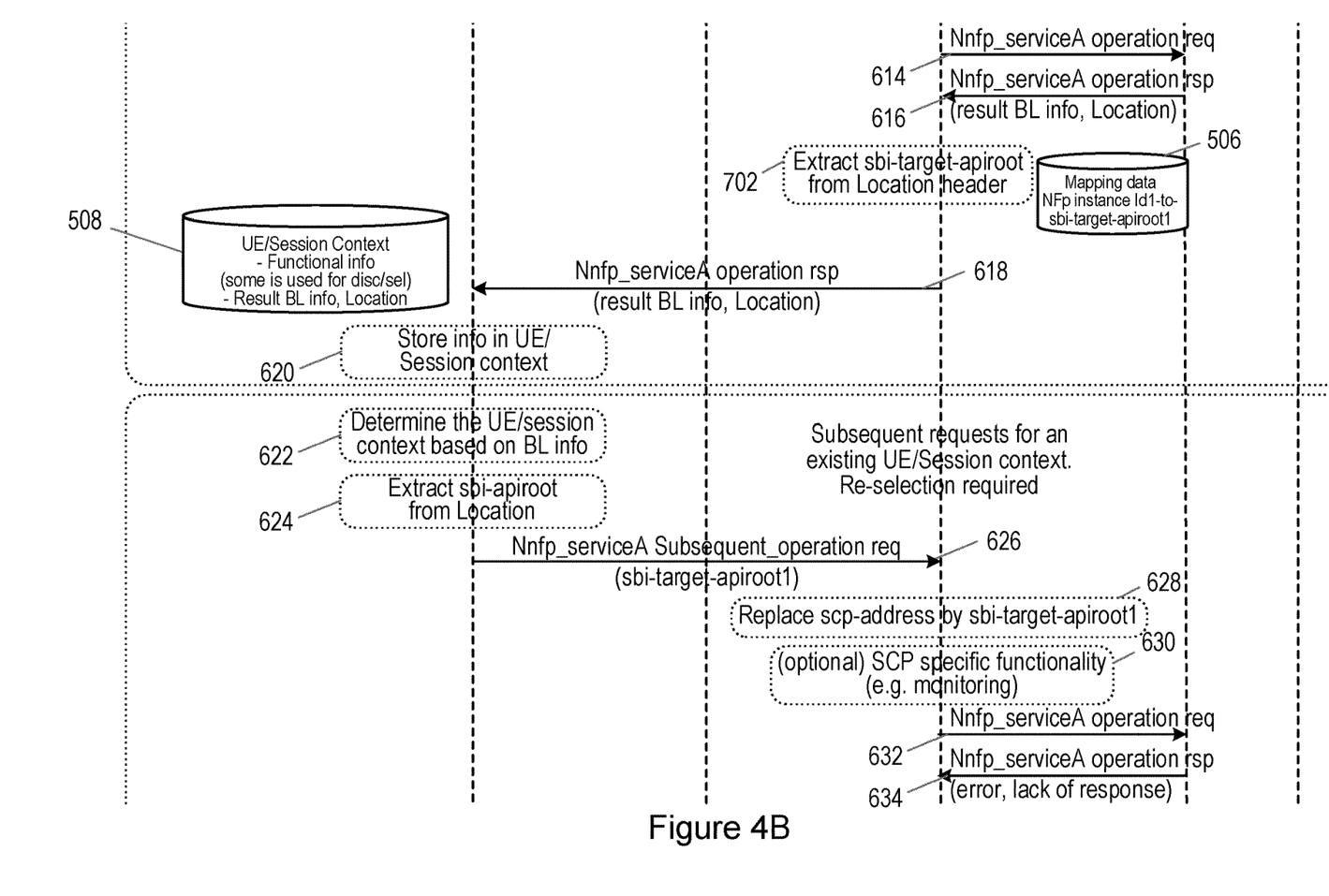
Figure 4C:
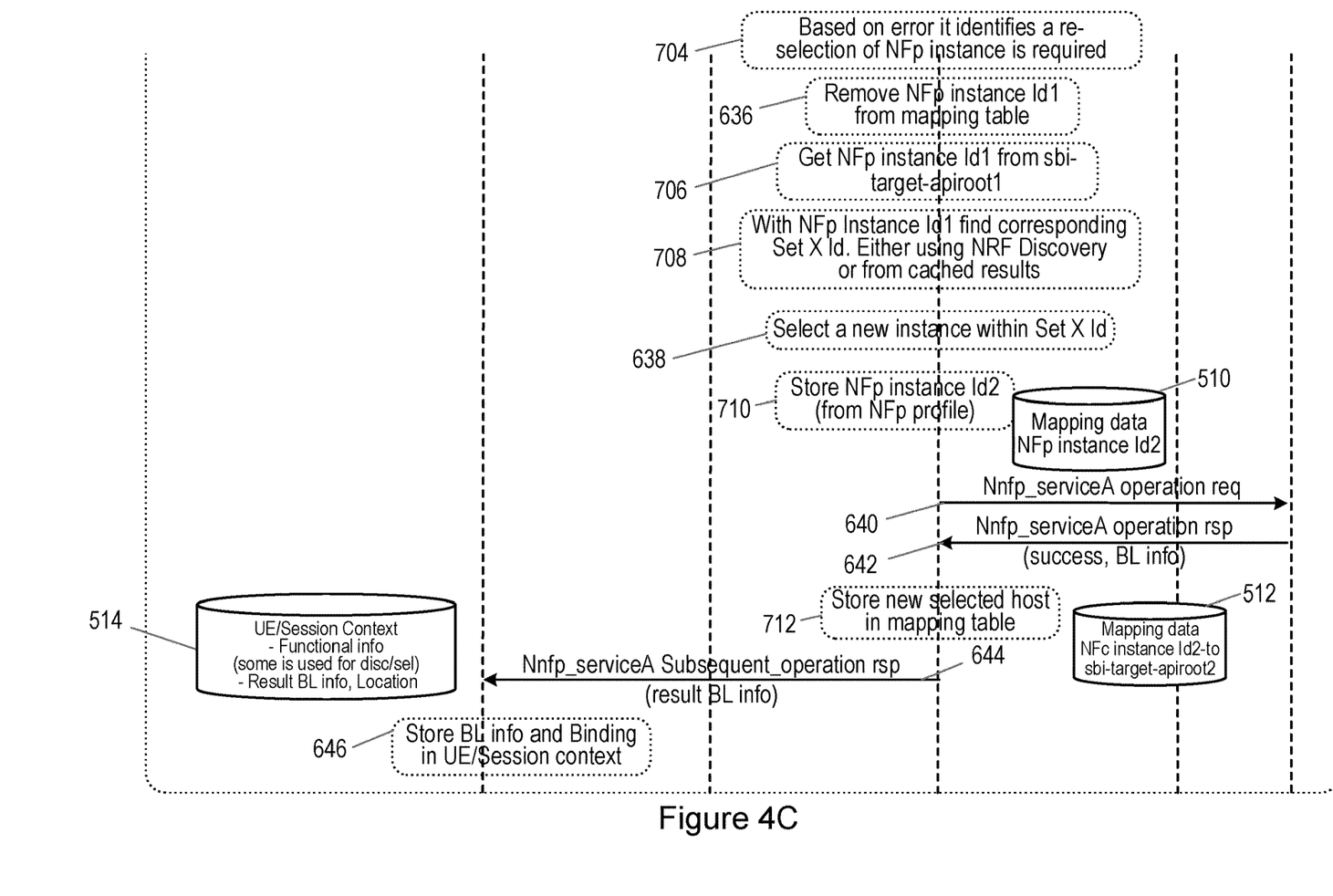

FIG. 4A-C is a signalling diagram illustrating is a signalling diagram illustrating an exchange of signals. The system illustrated in FIG. 4A-C comprises a first SCP node 10, a first NF node 20 of a service consumer ("NFc"), a second NF node 30 of a service producer ("NFp1"), and a third NF node 70 of a service producer ("NFp2"). The first SCP node 10 is configured to operate as an SCP between the first NF node 20 and the second NF node 30. The first SCP node 10 can be configured to operate as an SCP between the first NF node 20 and the third NF node 70.

The second NF node 30 can provide (e.g. be configured to execute or run) a service 40 and the third NF node 70 can provide (e.g. be configured to execute or run) a service 80. The second NF node 30 and the third NF node 70 can provide (e.g. be configured to execute or run) the same service or a different service. The second NF node 30 and the third NF node 70 can be part of a set 402 of NF nodes of a service producer. The system illustrated in FIG. 4A-C also comprises an NRF node 60. In some embodiments, an entity may comprise the first SCP node 10 and the NRF node 60. That is, in some embodiments, the first SCP node 10 can be merged with the NRF node 60 in a combined entity.

In some embodiments, the first SCP node 10 and the first NF node 20 may be deployed in independent deployment units and/or the first SCP node 10 and the second NF node 30 may be deployed in independent deployment units. Thus, an SCP node based on independent deployment units is possible, as described in 3GPP TS 23.501 V 16.5.0 (as cited above). In other embodiments, the first SCP node 10 may be deployed as a distributed network element. For example, in some embodiments, part (e.g. a service agent) of the first SCP node 10 may be deployed in the same deployment unit as the first NF node 20 and/or part (e.g. a service agent) of the first SCP node 10 may be deployed in the same deployment unit as the second NF node 30. Thus, an SCP node based on service mesh is possible, as described in 3GPP TS 23.501 V 16.5.0.

In some embodiments, at least one second SCP node may be configured to operate as an SCP between the first NF node 20 and the first SCP node 10 and/or at least one third SCP node may be configured to operate as an SCP between the first SCP node and the second NF node 30. Thus, a multipath of SCP nodes is possible. In some of these embodiments, the first SCP node 10 and one or both of the at least one second SCP node and the at least one third SCP node may be deployed in independent deployment units. In some embodiments, the at least one second SCP node and/or the at least one third SCP node may be deployed as distributed network elements.

In FIG. 4A-C, steps 500-508, 600-620, 700 and 702 relate to a first request for a user equipment (UE)/session context. As illustrated by block 500 of FIG. 4A-C, the UE/session context may be stored. As illustrated by block 600 of FIG. 4A-C, the first NF node 20 determines what discovery and selection parameters to use. The parameters can be associated with a certain service in a received request, which is not illustrated in FIG. 4A-C. As illustrated by block 502 of FIG. 4A-C, the first NF node 20 may store the UE/session context for the request. As illustrated by arrow 602 of FIG. 4A-C, the first request is sent to the first SCP node 10. More specifically, the first NF node 20 initiates transmission of the first request towards the first SCP node 10. The first SCP node 10 thus receives the first request.

As illustrated by arrow 604 of FIG. 4A-C, the first SCP node 10 uses a discovery request to obtain NF profile(s) of one or more NF nodes of the service producer for the service that needs to be executed from the NRF node 60. As illustrated by arrow 606 of FIG. 4A-C, the first SCP node 10 receives a response from the NRF node 60. Then, as illustrated by block 608 of FIG. 4A-C, the SCP node 10 selects one of the NFp nodes to provide the service (in this instance, the second NF node 30 is selected). As illustrated by blocks 504 and 700 of FIG. 4A-C, the NFp instance ID of the selected NFp node is stored, e.g. in the mapping data.

As illustrated by arrow 610 of FIG. 4A-C, in addition to storing the NFp instance ID, the first SCP node 10 modifies the first request to replace the SCP address with that of the selected host (the second NF node 30). The first SCP node 10 may also perform additional tasks, such as monitoring, as indicated by block 612 of FIG. 4A-C. As illustrated by arrow 614 of FIG. 4A-C, the (modified) first request is then sent to the second NF node 30. As illustrated by arrow 616 of FIG. 4A-C, a successful response is sent by the second NF node 30. As illustrated by block 702 of FIG. 4A-C, when the successful response is received by the SCP node 10, the first SCP node extracts location information of the second NF node from a header of the received response. The location information can, for example, be the 3GPP-sbi-target-api-root, which is an API root of a URI used to reach of the second NF node 30 (and may be the fully qualified domain name, FQDN, or internet protocol, IP, address the NFc 20 can use later to fill the 3GPP-sbi-target-apiroot header). The header may also be referred to as a location header and can, for example, be a hypertext transfer protocol (HTTP) header. In the present embodiment, the location information is stored in a mapping table, e.g. so a 1-1 association between an NFp instance ID and sbi-target-apiroot may be created (see block 506 of FIG. 4A-C).

As illustrated by arrow 618 of FIG. 4A-C, the response from the second NF node 30 may then be sent back to the first NF node 20. As illustrated by blocks 620 and 508 of FIG. 4A-C, the response may be stored by the first NF node 20, e.g. in the execution context (in this instance, UE/session context).

In FIGS. 4A-C, steps 510-514, 622-646 and 704-712 relate to a subsequent service request for an existing UE/session context. At block 622 of FIG. 4A-C, the first NF node 20 identifies that the subsequent request corresponds to the same execution context (UE/session context in this embodiment). At block 624 of FIG. 4A-C, the first NF node 20 extracts the sbi-apiroot (API root of a URI) and then, at arrow 626 of FIG. 4A-C, the first NF node 20 sends a service request, also referred to as a subsequent service request. The first NF node 20 initiates transmission of the subsequent service request towards the first SCP node 10. Thus, the first SCP node 10 receives the subsequent service request.

At block 628 of FIG. 4A-C, the first SCP node 10 modifies the subsequent service request to replace the SCP address with that of the selected host (the second NF node 30). The first SCP node 10 may also perform additional tasks, such as monitoring, as indicated by block 630 of FIG. 4A-C. At block 632 of FIG. 4A-C, the (modified) subsequent service request is then sent to the second NF node 30. Steps 628, 630 and 632 of FIG. 4A-C are similar to steps 610, 612 and 614 of FIG. 4A-C as discussed above. However, in this instance, there is no successful response from the second NF node 30. Instead, at arrow 634 of FIG. 4A-C, a failure response (that is an error response or lack of response to the subsequent service request) occurs. The second NF node 30 is therefore not able to provide the service requested in the subsequent request. The second NF node 30 may also be prevented from providing the service if the first SCP node 10 is prevented from sending the subsequent request to the second NF node 30, as discussed above. In the present embodiment, an error response is received.

At block 704 of FIG. 4A-C, in response to the lack of a successful response (the error response in this embodiment), the first SCP node 10 identifies that a re-selection of the NFp instance is required. In this embodiment, the first SCP node 10 then removes the mapping information of the second NF node 30 from the mapping table, at block 636 of FIG. 4A-C. At block 706 of FIG. 4A-C, the location information of the second NF node 30 is used in a discovery process to identify the associated identifier of the second NF node 30. At block 708 of FIG. 4A-C, this identifier is then used to obtain a profile of the second NF node 30 from which a set ID (Set X ID) can be found. The discovery process may be a new discovery process involving sending a discovery request to the NRF node 60 (not shown), and/or may involve the first SCP node 10 searching stored results (also not shown).

Once the set ID has been obtained, a further NFp instance can be selected from the set, as illustrated by block 638 of FIG. 4A-C. In this embodiment, the set is Set X 402, as shown in FIG. 4A. The second NF node 30 (NFp1) is part of Set X 402, and the third NF node 70 is also part of Set X. As also shown in FIG. 4A, both of these nodes can support Service A 40, 80. At blocks 510 and 710 of FIG. 4A-C, the identifier of the (re-selected) third NF node 70 is obtained from the profile of that node and is stored, e.g. in the mapping data. As illustrated by arrow 640 of FIG. 4A-C, the subsequent service request is then sent to the third NF node 70. As illustrated by arrow 642 of FIG. 4A-C, a successful response to the subsequent service request is received.

Once this successful response has been received by the first SCP node 10, the mapping table can be updated to associate the identifier of the third NF node 70 with the location information of the third NF node 70 (the location information being obtained from the response), as shown at blocks 712 and 512 of FIG. 4A-C. The location information for the second NF node 30 may also be retained and associated with the identifier of the third NF node 70; this may provide support for situations where the first NF node 20 may send a further subsequent request that includes the location information for the second NF node 30, rather than the location information for the third NF node 70. By allowing the identifier of the third NF node 70 to be associated with the locations of both the (old) second NF node 30 and (current) third NF node 70, the correct response to the further subsequent request by the first SCP node 10 may be ensured.

As illustrated by arrow 644 of FIG. 4A-C, e.g. following the update of the mapping table, the response from the third NF node 70 may then be sent to the first NF node 20. More specifically, the first SCP node 10 may initiate transmission of this response towards the first NF node 20. The first NF node 20 thus receives this response. As illustrated by blocks 514 and 646 of FIG. 4A-C, the first NF node 20 may then store the response (or information from the response), e.g. in the execution context. Steps 644, 514 and 646 of FIG. 4A-C are similar to steps 618, 508 and 620 of FIG. 4A-C in the context of the first request for the service as discussed above.

Figure 5:
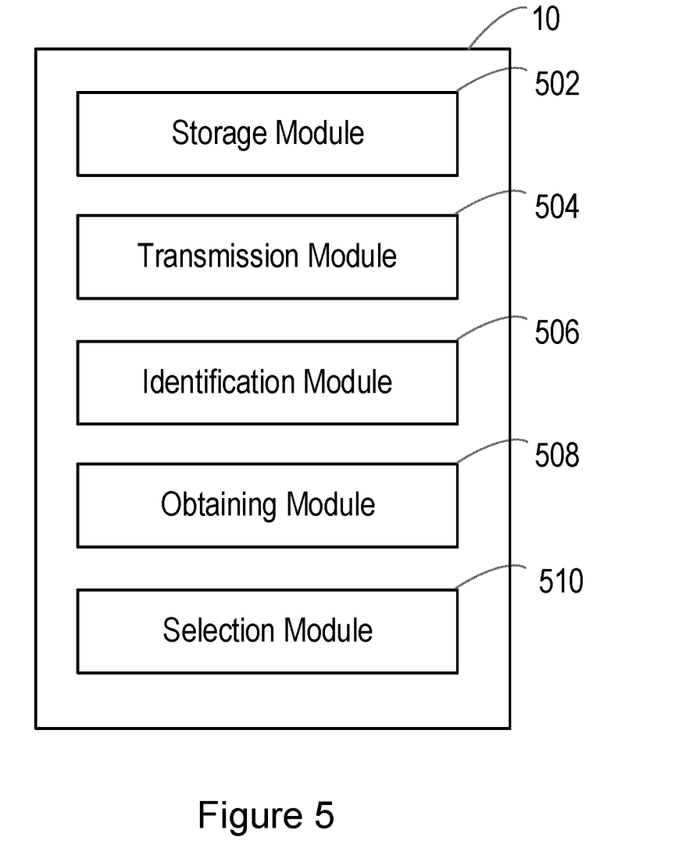
FIG. 5 is a block diagram illustrating a first SCP node according to an embodiment.

FIG. 5 is a block diagram illustrating a first SCP node 10 in accordance with an embodiment. The first SCP node 10 can handle a service request in a network. The first SCP node 10 can operate as an SCP between a first NF node of a service consumer and a second NF node of a service producer in the network. The first SCP node 10 comprises a selection module 510 configured to, in response to receiving a first request for a further NF node to provide a first service 40 requested by a first NF node 20 in a first request, select a second NF node 30 as the further NF node. The first SCP node 10 further comprises a storage module 502 configured to store an identifier of the second NF node 30. The first SCP node 10 further comprises a transmission module 504 configured to initiate transmission towards the second NF node 30 of the first request. The storage module 502 is further configured to store location information of the second NF node 30. The transmission module 504 is further configured to initiate transmission of a first response from the second NF node 30 towards the first NF node 20, and in response to a subsequent request to initiate transmission of the subsequent request towards the second NF node 30. The first SCP node 10 further comprises an identification module 506 configured to, if the second request cannot be fulfilled by the second NF node 30, identify the identifier of the second NF node 30 using the associated location information. The first SCP node 10 further comprises an obtaining module 508 configured to obtain a profile of the second NF node 30 using the identifier of the second NF node 30. The selection module 510 is further configured to reselect a third NF node 70 using the profile of the second NF node 30. The transmission module 504 is further configured to initiate transmission of the subsequent request to the third NF node 70.

There is also provided a computer program comprising instructions which, when executed by processing circuitry (such as the processing circuitry 12 of the first SCP node 10 described earlier), cause the processing circuitry to perform at least part of the method described herein. There is provided a computer program product, embodied on a non-transitory machine-readable medium, comprising instructions which are executable by processing circuitry (such as the processing circuitry 12 of the first SCP node 10 described earlier) to cause the processing circuitry to perform at least part of the method described herein. There is provided a computer program product comprising a carrier containing instructions for causing processing circuitry (such as the processing circuitry 12 of the first SCP node 10 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first SCP node functionality described herein can be performed by hardware. Thus, in some embodiments, the first SCP node 10 described herein can be a hardware node. However, it will also be understood that optionally at least part or all of the first SCP node functionality described herein can be virtualized. For example, the functions performed by the first SCP node 10 described herein can be implemented in software running on generic hardware that is configured to orchestrate the node functionality. Thus, in some embodiments, the first SCP node 10 described herein can be a virtual node. In some embodiments, at least part or all of the first SCP node functionality described herein may be performed in a network enabled cloud. The first SCP node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there is advantageously provided an improved technique for handling service requests in a network. The SCP node 10 can operate in mode D without requiring UE/session context information and without requiring binding to be used, and thereby the versatility of the system is improved.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for handling a service request in a communication network, wherein the method is performed by a service communication proxy (SCP) node that is configured to operate as an SCP between a first network function (NF) node of a service consumer and a second NF node of a service producer in the communication network, the method comprising:
performing the following in response to receiving from the first NF node a first request for a further NF node to provide a first service requested by the first NF node:
using discovery parameters received from the first NF node, selecting the second NF node as the further NF node to provide the first service,
storing an identifier of the second NF node obtained from a profile of the second NF node, and
initiating transmission towards the second NF node of the first request;
in response to receiving from the second NF node a first response to the first request, obtaining location information of the second NF node from the first response and storing the location information of the second NF node in association with the identifier of the second NF node; and
initiating transmission of the first response towards the first NF node.

2. The method of claim 1, wherein the identifier (ID) of the second NF node is an instance ID of the second NF node.

3. The method of claim 2, wherein one of the following applies:
the profile of the second NF node is received at the SCP node in a discovery response from a Network Repository Function (NRF) node, the discovery response being sent by the NRF node in response to a discovery request from the SCP node; or
the profile of the second NF node is stored in the SCP node.

4. The method of claim 1, wherein the location information of the second NF node is an apiRoot of the second NF node.

5. The method of claim 4, wherein the apiRoot of the second NF node is obtained from a location header included in the first response from the second NF node.

6. The method of claim 1, wherein the SCP node stores the identifier of the second NF node and the location information of the second NF node in a mapping table.

7. The method of claim 6, wherein:
the mapping table stores the identifier of the second NF node in a 1-to-1 association with the location information of the second NF node; and/or
the mapping table is stored in a memory of, or contactable by, the SCP node.

8. The method of claim 1, further comprising:
in response to receiving from the first NF node a second request that is a subsequent request for the second NF node to provide the first service, initiating transmission towards the second NF node of the second request, wherein the second request includes the location information of the second NF node; and performing the following operations when the second request cannot be fulfilled by the second NF node:
- identifying the associated identifier of the second NF node, using the location information of the second NF node;
- obtaining a profile of the second NF node using the identifier of the second NF node;
- re-selecting a third NF node using the profile of the second NF node; and
- initiating transmission of the second request to the third NF node.

9. The method of claim 8, wherein the second request cannot be fulfilled by the second NF node when any one or more of the following applies:
- the second request transmitted towards the second NF node is unsuccessful;
- no response is received from the second NF node to the second request transmitted towards the second NF node; and
- transmission of the second request towards the second NF node is prevented.

10. The method of claim 8, wherein obtaining the profile of the second NF node comprises performing a discovery process using the identifier of the second NF node to obtain the profile of the second NF node.

11. The method of claim 10, wherein one or more of the following applies: the discovery process is a new discovery, and performing the discovery process comprises checking stored discovery results.

12. The method of claim 8, wherein:
- the profile of the second NF node is a service producer (NFp) profile;
- the NFp profile is used to identify a set of NF nodes of the service producer that comprises the second NF node; and
- the set of NF nodes further comprises the third NF node of the service producer.

13. The method of claim 12, wherein:
- the set of NF nodes of the service producer that comprises the second NF node is identified using a Set ID; and
- the third NF node is selected from the NF nodes specified by the Set ID.

14. The method of claim 8, further comprising:
- receiving an acceptance response from the third NF node including location information of the third NF node; and
- storing an identifier of the third NF node in association with the location information of the third NF node.

15. The method of claim 14, wherein one of the following applies:
- the identifier of the third NF node and location information of the third NF node replace identifier of the second NF node and location information of the second NF node; or
- the identifier of the third NF node and location information of the third NF node are stored in addition to the location information of the second NF node, wherein the location information of the second NF node is associated with the stored identifier of the third NF node.

16. A service communication proxy (SCP) node configured to operate as an SCP between a first network function (NF) node of a service consumer and a second NF node of a service producer in the communication network, wherein the SCP node comprises:
- communications interface circuitry configured to communicate with at least the first NF node and the second NF node; and
- processing circuitry operably coupled to the communications interface circuitry, wherein the processing circuitry and the communications interface circuitry are configured to perform the method of claim 1.

17. A system comprising:
- at least one of the SCP node of claim 16; and
- one or more of the following:
  - at least one first NF node of a service consumer,
  - at least one second NF node of a service producer; and
  - at least one third NF node of the service producer.

18. A non-transitory, machine-readable medium storing computer-executable instructions that, when executed by processing circuitry associated with a service communication proxy (SCP) node configured to operate as an SCP between a first network function (NF) node of a service consumer and a second NF node of a service producer in a communication network, configure the SCP node to perform operations corresponding to the method of claim 1.

* * * * *

UNITED STATES PATENT AND TRADEMARK OFFICE
CERTIFICATE OF CORRECTION

PATENT NO. : 11,924,294 B2
APPLICATION NO. : 18/015185
DATED : March 5, 2024
INVENTOR(S) : Rodrigo et al.

It is certified that error appears in the above-identified patent and that said Letters Patent is hereby corrected as shown below:

In the Specification

In Column 1, Line 63, delete "FIG. 10," and insert -- FIG. 1C, --, therefor.

In Column 5, Line 67, delete "node" and insert -- node 10 --, therefor.

In Column 6, Line 43, delete "memory" and insert -- memory 14 --, therefor.

In Column 7, Line 67, delete "node" and insert -- node 10 --, therefor.

In Column 10, Line 37, delete "node" and insert -- node 10 --, therefor.

Signed and Sealed this
Twenty-eighth Day of May, 2024

Katherine Kelly Vidal
*Director of the United States Patent and Trademark Office*